(12) United States Patent
Sun et al.

(10) Patent No.: US 7,599,074 B2
(45) Date of Patent: Oct. 6, 2009

(54) GRATING ANGLE MAGNIFICATION ENHANCED ANGULAR SENSOR AND SCANNER

(75) Inventors: Ke-Xun Sun, Stanford, CA (US); Robert L. Byer, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 353 days.

(21) Appl. No.: 11/820,720

(22) Filed: Jun. 19, 2007

(65) Prior Publication Data

US 2008/0002197 A1 Jan. 3, 2008

Related U.S. Application Data

(60) Provisional application No. 60/815,098, filed on Jun. 19, 2006.

(51) Int. Cl.
*G01B 11/14* (2006.01)
(52) U.S. Cl. ...................................... 356/614
(58) Field of Classification Search .......... 356/614–624
See application file for complete search history.

(56) References Cited

U.S. PATENT DOCUMENTS

| 4,330,212 A | 5/1982 | Miller | |
| 4,804,270 A * | 2/1989 | Miller et al. | 356/508 |
| 5,073,918 A | 12/1991 | Kamon | |
| 5,359,409 A * | 10/1994 | Wildnauer et al. | 356/334 |
| 5,774,207 A * | 6/1998 | Yoshida et al. | 356/3.07 |
| 6,831,750 B2 | 12/2004 | Mehrl et al. | |
| 7,110,103 B2 | 9/2006 | Montgomery et al. | |
| 7,483,134 B2 * | 1/2009 | Toth et al. | 356/328 |
| 2001/0019410 A1 * | 9/2001 | Kojima | 356/334 |
| 2009/0153880 A1 * | 6/2009 | Klaver et al. | 356/614 |

FOREIGN PATENT DOCUMENTS

JP  07270121 A  * 10/1995

* cited by examiner

*Primary Examiner*—Michael P Stafira
(74) *Attorney, Agent, or Firm*—Lumen Patent Firm

(57) ABSTRACT

An angular magnification effect of diffraction is exploited to provide improved sensing and scanning. This effect is most pronounced for a normal or near-normal incidence angle in combination with a grazing diffraction angle, so such configurations are preferred. Angular sensitivity can be further enhanced because the width of the diffracted beam can be substantially less than the width of the incident beam. Normal incidence configurations with two symmetric diffracted beams are preferred, since rotation and vertical displacement can be readily distinguished. Increased sensitivity to vertical displacement can be provided by incorporating an interferometer into the measurement system. Quad cell detectors can be employed to provide sensitivity to rotation about the grating surface normal. A 2-D grating can be employed to provide sensitivity to angular displacements in two different planes (e.g., pitch and yaw). Combined systems can provide sensitivity to vertical displacement and to all three angular degrees of freedom.

23 Claims, 9 Drawing Sheets

GRATING ANGLE MAGNIFICATION ENHANCED ANGULAR SENSOR AND SCANNER

CROSS REFERENCE TO RELATED APPLICATIONS

This application claims the benefit of U.S. provisional patent application 60/815,098, filed on Jun. 19, 2006, entitled "Grating Angle Magnification Enhanced Angular Sensor and Scanner", and hereby incorporated by reference in its entirety.

GOVERNMENT SPONSORSHIP

This invention was made with government support under subcontract number 1273827 from NASA(JPL). The government has certain rights in this invention.

FIELD OF THE INVENTION

This invention relates to deflection of an optical beam for measuring angular displacement or for beam scanning.

BACKGROUND

Measuring an angular displacement of a test object by reflecting a beam of light from the test object and measuring the beam deflection corresponding to the angular displacement is well known in the art. The basic principles of this method are shown on FIG. 1. An incident light beam 102 is reflected from a surface 112 to provide a reflected beam 114. If the angle of surface 112 changes, e.g., to align with dotted line 122, incident light beam 102 would be reflected along path 124. If the angular displacement of the reflective surface is $\epsilon$, the corresponding difference in reflected beam direction is $2\epsilon$, which follows from the geometry of FIG. 1 and the reflection law ($\theta_i = \theta_r$).

It is also known in the art to measure angular displacement using optical systems that employ diffraction instead of or in addition to reflection. For example, U.S. Pat. No. 4,330,212 considers illumination of a diffraction grating on a test object. Changes in the position of the resulting diffraction pattern correspond to angular displacement of the test object. For example, a roll (rotation about the grating surface normal) of the test object will provide a corresponding roll of the diffraction pattern. A similar approach is also considered in U.S. Pat. No. 7,110,103.

In these references, diffraction is exploited to provide a pattern having multiple spots as opposed to a single reflected beam. Such a multiple spot pattern can provide information on angular displacements that cannot be measured with a single beam approach, such as rotation about the surface normal of the test object.

For the configuration of FIG. 1, the displacement of the reflected beam on a detector is $2\epsilon L$, assuming a reflected beam working distance of L from the test object to the detector. In some applications, such as space based gravitational wave sensors, it is simultaneously required to provide very high angular sensitivity in combination with a relatively limited working distance L. In such cases, it can be difficult or even impossible to meet the combined sensitivity and working distance requirements, thereby requiring an undesirable design compromise.

Accordingly, it would be an advance in the art to provide optical measurement of angular displacement having improved angular sensitivity.

SUMMARY

An angular magnification effect of diffraction is exploited to provide improved sensing and scanning. This effect is most pronounced for a normal or near-normal incidence angle in combination with a grazing diffraction angle, so such configurations are preferred. Angular sensitivity can be further enhanced because the width of the diffracted beam can be substantially less than the width of the incident beam. Normal incidence configurations with two symmetric diffracted beams are preferred, since rotation and vertical displacement can be readily distinguished. Increased sensitivity to vertical displacement can be provided by incorporating an interferometer into the measurement system. Quad cell detectors can be employed to provide sensitivity to rotation about the grating surface normal. A 2-D grating can be employed to provide sensitivity to angular displacements in two different planes (e.g., pitch and yaw). Combined systems can provide sensitivity to vertical displacement and to all three angular degrees of freedom.

DETAILED DESCRIPTION

Figure 1:
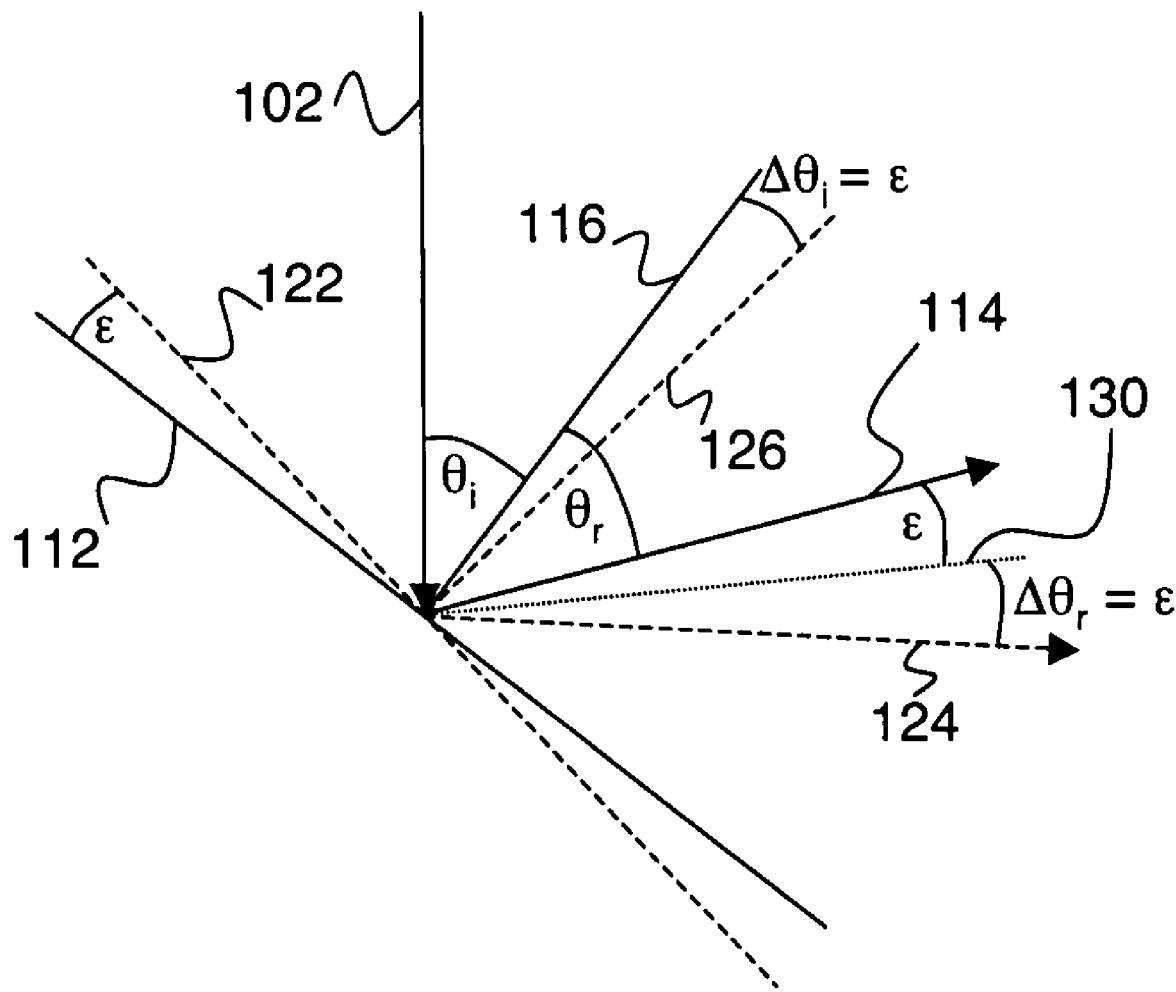
FIG. 1 shows a known arrangement for measuring angular change.

To better appreciate the principles of the present invention, it is helpful to first consider the conventional geometry of FIG. 1. Incident beam 102 is reflected by surface 112 to provide a reflected beam 114. If an angular displacement of surface 112 shifts it to a new position 122, the corresponding reflected beam would be beam 124. The surface normal of surface 112 is shown as 116, while the surface normal of the surface 122 is shown as 126. Thus displacing surface 112 by $\epsilon$ causes a corresponding change in the angle of incidence, $\Delta\theta_i$, which is equal to $\epsilon$. From the law of reflection ($\theta_i = \theta_r$), it follows that the corresponding change in the angle of reflection $\Delta\theta_r$ is also equal to $\epsilon$. Because the angle between dotted line 130 and beam path 114 is $\epsilon$, the angle between surface normal 126 and dotted line 130 is $\theta_r$. The new reflected beam path 124 must make an angle with respect to surface normal 126 which is larger by $\Delta\theta_r = \epsilon$, as shown. Therefore, the difference between reflected beam path 114 and reflected beam path 124 is $2\epsilon$. To summarize, in the arrangement of FIG. 1 an angular displacement of $\epsilon$ causes a corresponding change in reflected angle $\Delta\theta_r$ which is equal to $\epsilon$. The resulting deflection of the reflected beam from its original path is $2\epsilon$.

Figure 2:
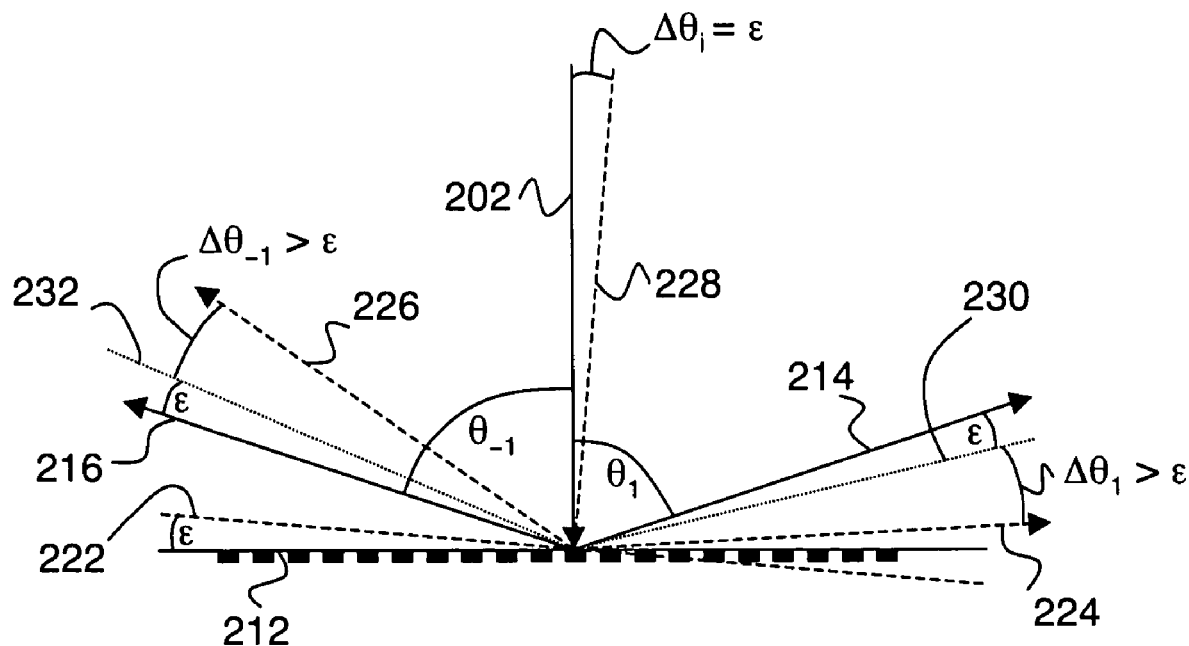
FIG. 2 is a diagram showing principles of the invention.

A key aspect of the present invention is the discovery that substantially higher angular sensitivity can be obtained in suitably selected diffraction geometries. FIG. 2 is a diagram showing principles of the invention. A normally incident beam 202 is diffracted from a diffraction grating 212. In this example, diffracted beams 214 and 216 correspond to 1 and −1 order diffraction respectively. As before, an angular displacement of grating 212 by ϵ shifts it to a new position shown schematically by dashed line 222. Dotted lines 230 and 232 differ from beam paths 214 and 216 respectively by ϵ, which is also the change in angle of incidence shown by surface normal 228.

The angular displacement of grating 212 induces corresponding changes in the 1 and −1 order diffraction angles, $\Delta\theta_1$ and $\Delta\theta_{-1}$ respectively, shown by beam paths 224 and 226. These changes are determined by the grating equation:

$$d(\sin\theta_m - \sin\theta_i) = m\lambda, \quad (1)$$

where $\lambda$ is the optical wavelength, m is the diffraction order, $\theta_i$ is the angle of incidence, $\theta_m$ is the mth order diffraction angle, and d is the grating period. For small angular displacements, Eq. 1 gives $$\Delta\theta_m = M\Delta\theta_i, \quad (2)$$

where $$M = \left(\frac{\cos\theta_i}{\cos\theta_m}\right). \quad (3)$$

The change in diffracted angle is related to the change in incidence angle via a magnification factor M, which in general can be less than 1, equal to one, or greater than one. For increased angular sensitivity relative to the conventional arrangement of FIG. 1, M is greater than one, which implies $\theta_i < \theta_m$, and preferably M>2. More preferably, normal or near-normal incidence is employed (e.g., $\theta_i < 10°$) and diffraction is at a grazing angle (e.g., $\theta_m > 75°$). Significant angular magnification can be obtained. For example, if $\theta_i = 0°$ and $\theta_m = 80°$, $\Delta\theta_m = 5.8\Delta\theta_i$. As is well known in the art, selection of $\theta_i$ and $\theta_m$ in accordance with the above principles entails selection of $\theta_i$, $\lambda$, d, and the diffraction order m.

An important advantage of the invention is that increased angular sensitivity is provided "for free", by the diffraction geometry itself. No further complications such as increased laser power are required to realize this advantage. This angular magnification effect does not appear to be appreciated in previous work relating to diffraction for measuring angular displacement.

Figure 3:
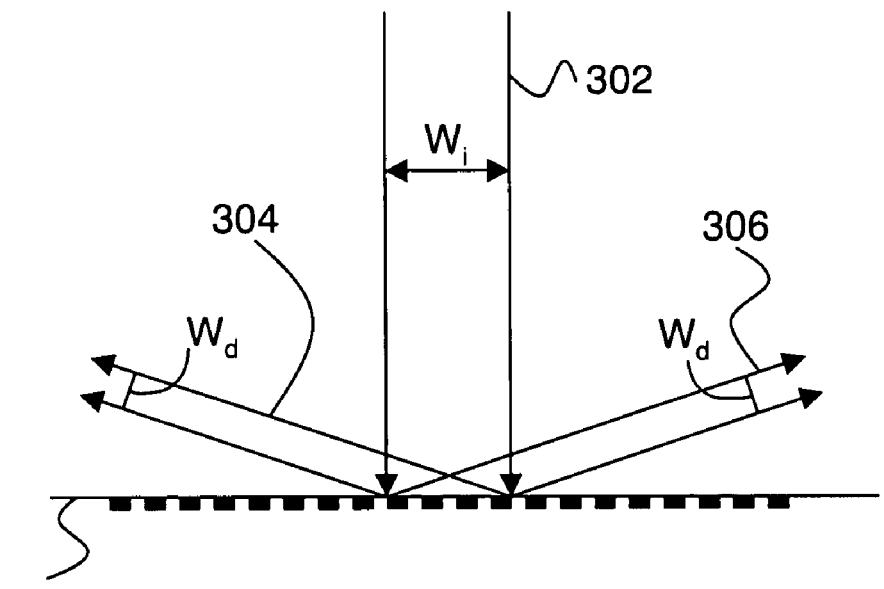
FIG. 3 is another diagram showing principles of the invention.

Angular sensitivity is further enhanced by another consequence of the diffraction geometry, shown on FIG. 3. Here an incident beam 302 is diffracted from grating 212 to provide diffracted beams 304 and 306. As shown, the width $W_d$ of the diffracted beams is substantially less than the width $W_i$ of the incident beam. Analysis shows that the beam widths are related as follows: $W_i = MW_d$, where M is the magnification factor as defined above. Thus for the preferred range M>2, $W_d < 0.5\, W_i$ follows. In practice, diffracted beam position is typically measured with a position sensitive photodetector (e.g., a split cell detector). Other things being equal, reducing the beam width at such a detector causes a proportionate increase in position sensitivity, because it is easier to precisely detect a small position change of a narrow beam than of a wide beam. In practice, both angular magnification and beam width reduction can be relevant, thereby providing a sensitivity improvement on the order of $M^2$. For $\theta_i = 0°$ and $\theta_m = 80°$, $M^2 = 33$, and for $\theta_i = 0°$ and $\theta_m = 85°$, $M^2 = 132$.

The above-described principles can be applied in various ways to provide improved angular sensors and scanners. FIGS. 4-11 show several examples of embodiments of the invention.

Figure 4:
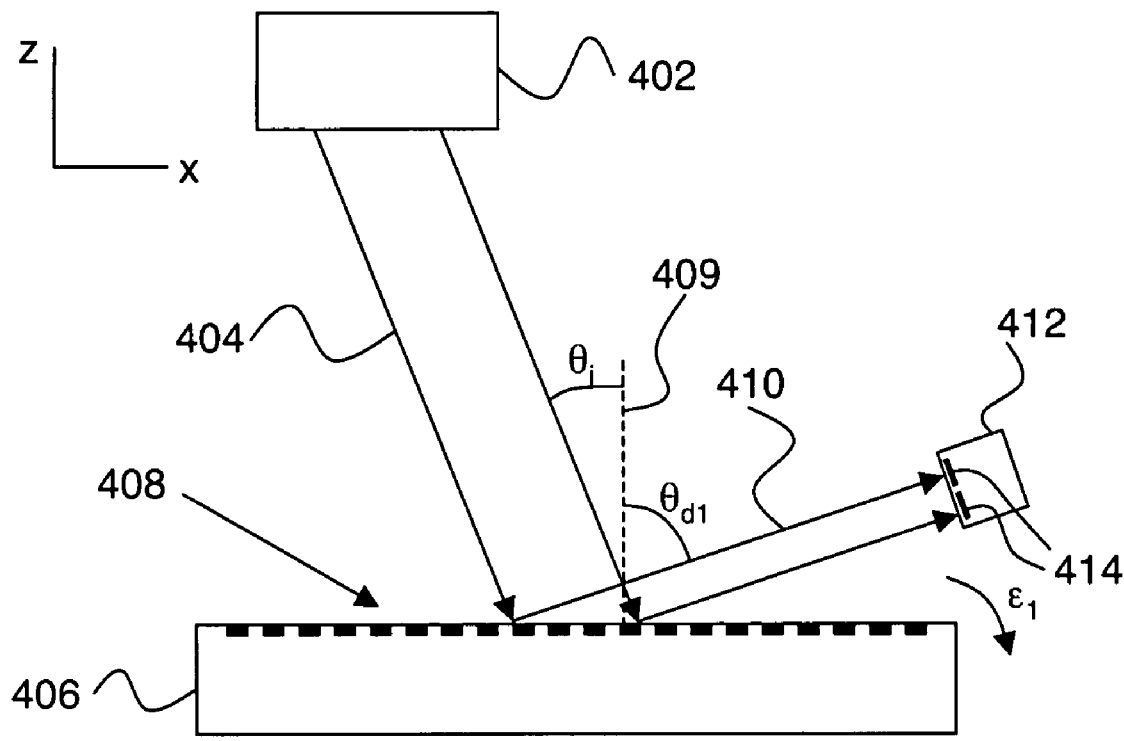
FIG. 4 shows a first embodiment of the invention.

FIG. 4 shows a first embodiment of the invention. In this example, an optical source 402 provides an incident beam 404 of substantially monochromatic optical radiation to a test body 406. A grating 408 is disposed on test object 406 and is illuminated by incident beam 404. Incident beam 404 is incident on grating 408 at an angle of incidence $\theta_i$ with respect to grating normal 409. Grating 408 provides a first diffracted beam 410 responsive to the illumination by incident beam 404. First diffracted beam 410 has a diffraction angle $\theta_{d1}$ with respect to grating normal 409. A first diffraction plane is defined by the incident beam and first diffracted beam.

A first detector 412 receives first diffracted beam 410 and provides a first output $Z_1$ responsive to a position of diffracted beam 410 on detector 412 in the first diffraction plane. Such a position sensitive detector can be provided in various known ways, such as with a split cell detecting element 414.

If the angular orientation of test object 406 is changed by a first change $\epsilon_1$ from a reference orientation of test object 406, corresponding changes $\Delta\theta_i$ and $\Delta\theta_{d1}$ of the incidence and diffraction angles are induced. As described above, $\Delta\theta_i = \epsilon_1$ and $\theta_i$ and $\theta_{d1}$ are selected such that $\Delta\theta_{d1}$ is substantially greater than $\epsilon_1$, thereby enhancing sensitivity due to the above-described angular magnification effect.

Figure 5:
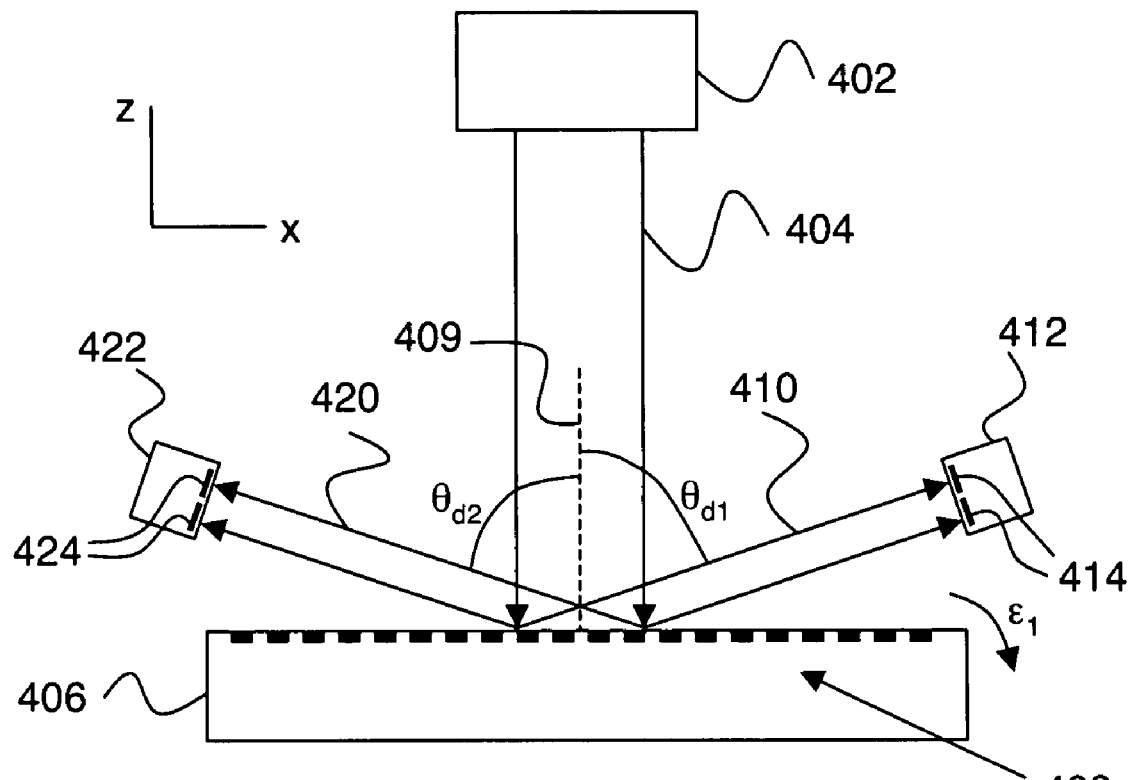
FIG. 5 shows a second embodiment of the invention.

FIG. 5 shows a second embodiment of the invention. This example shows a preferred embodiment where normal incidence and symmetric diffraction into 1 and −1 orders are employed. Accordingly, in this embodiment it is preferred that grating 408 have a period such that at the wavelength of incident beam 404, grating 408 diffracts only into orders 0, 1, and −1. This embodiment is similar to the embodiment of FIG. 4, except that grating 408 also provides a second diffracted beam 420 responsive to the illumination by incident beam 404. Second diffracted beam 420 has a diffraction angle $\theta_{d2}$ with respect to grating normal 409. Second diffracted beam 420 is also in the first diffraction plane.

A second detector 422 having a split cell detecting element 424 receives second diffracted beam 420 and provides a second output $Z_2$ responsive to a position of diffracted beam 420 on detector 422 in the first diffraction plane. Angular displacement of test object 406 by an angle $\epsilon_1$ also induces a corresponding change $\Delta\theta_{d2}$ of the diffraction angle $\theta_{d2}$ of second diffraction beam 420. The change $\Delta\theta_{d2}$ is also substantially greater than $\epsilon_1$ due to the above-described angular magnification effect.

Figure 6A:
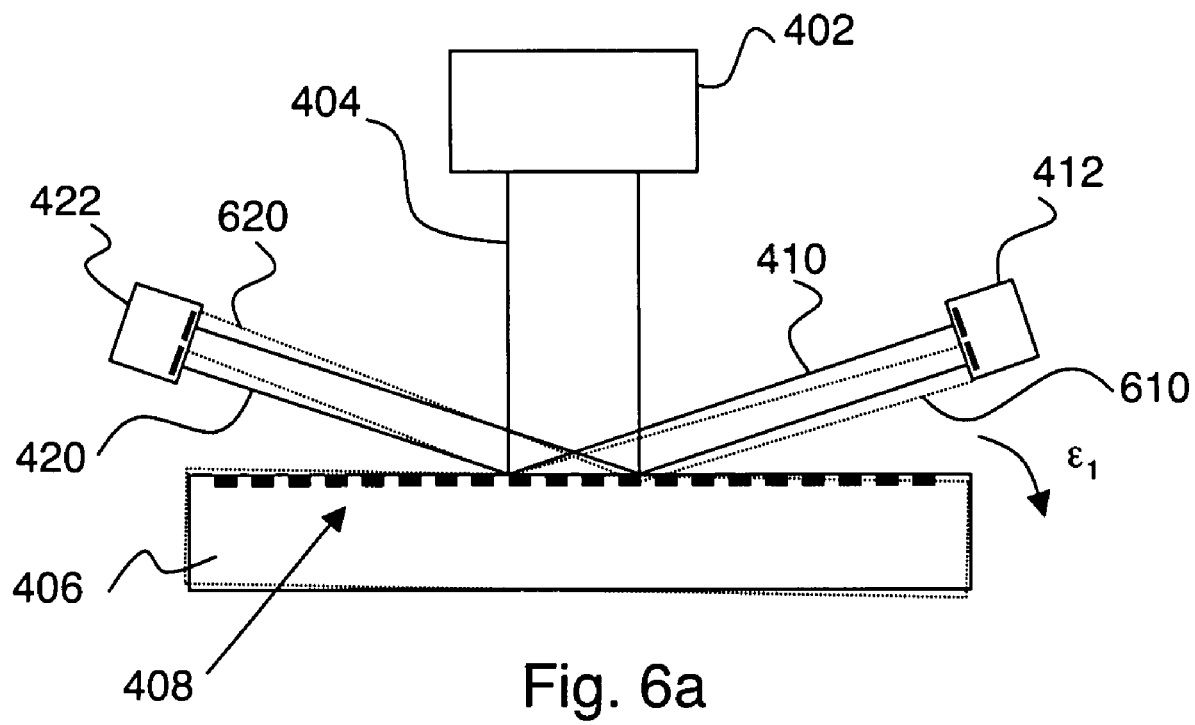
FIGS. 6a-b show operation of the embodiment of FIG. 5.
Figure 6B:
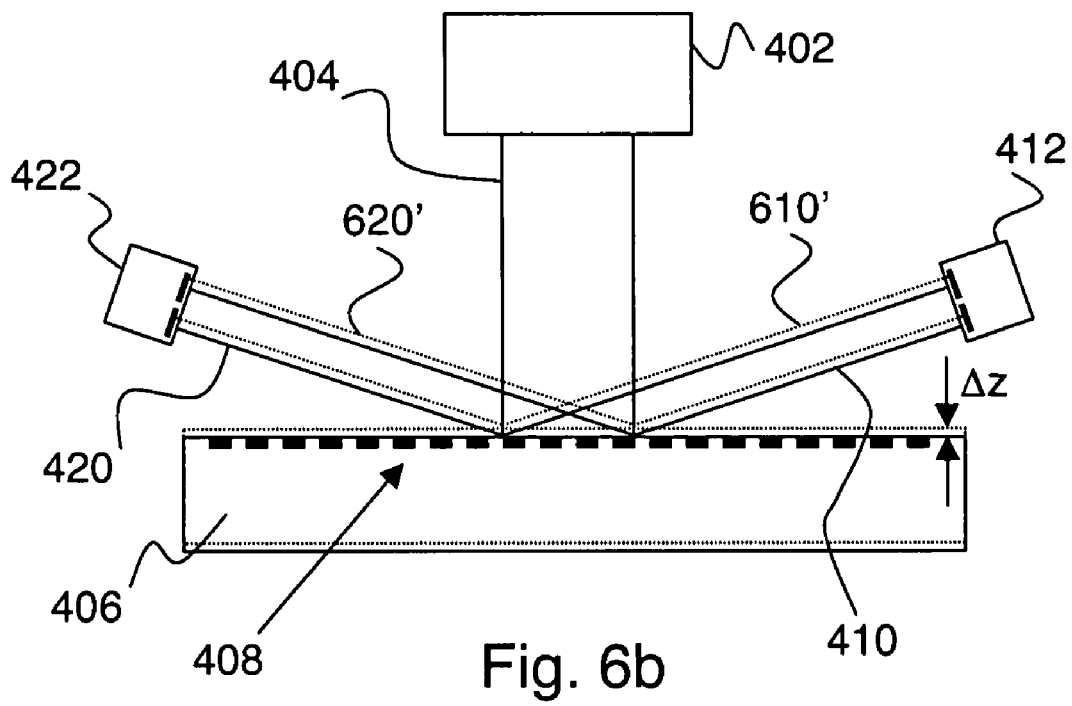

FIGS. 6a-b show operation of the embodiment of FIG. 5. FIG. 6a shows the result of an angular displacement $\epsilon_1$, where first diffracted beam 410 moves to a new position 610, and second diffracted beam 420 moves to a new position 620. The corresponding outputs of the position sensitive detectors, $Z_1$ and $Z_2$, change in opposite senses, since first beam 410 moves down on first detector 412 while second beam 420 moves up on second detector 422.

FIG. 6b shows the result of a vertical displacement $\Delta z$, where first beam 410 moves to a new position 610' and second beam 420 moves to a new position 620'. The corresponding outputs of the position sensitive detectors, $Z_1$ and $Z_2$, change in the same sense, since first beam 410 moves up on first detector 412 and second beam 420 also moves up on second detector 422.

Since angular displacement and vertical displacement have different effects on the detector position outputs, these two perturbations of test body position can be readily distinguished, which is a significant advantageous feature of this embodiment. More specifically, a difference of $Z_1$ and $Z_2$ is responsive to angular displacement $\epsilon_1$ but not to vertical displacement $\Delta z$, while a sum of $Z_1$ and $Z_2$ is responsive to vertical displacement $\Delta z$ but not to angular displacement $\epsilon_1$.

Angular sensitivity is enhanced by the dual detector configuration, since both detectors can contribute to the rotation signal. Another advantage of this configuration is that differential mode rotation sensing avoids effects due to laser frequency noise, since such effects give rise to common-mode errors. Extraordinary sensitivity has been achieved in this configuration. In one experiment, 0.1 nrad/Hz$^{1/2}$ sensitivity was demonstrated using a grating having 935 lines/mm at a wavelength of 1064 nm. The diffraction angles were about 84°, and the working distance was 6 cm. This combination of sensitivity and working distance is suitable for demanding applications, such as space based gravitational reference sensors.

Figure 7:
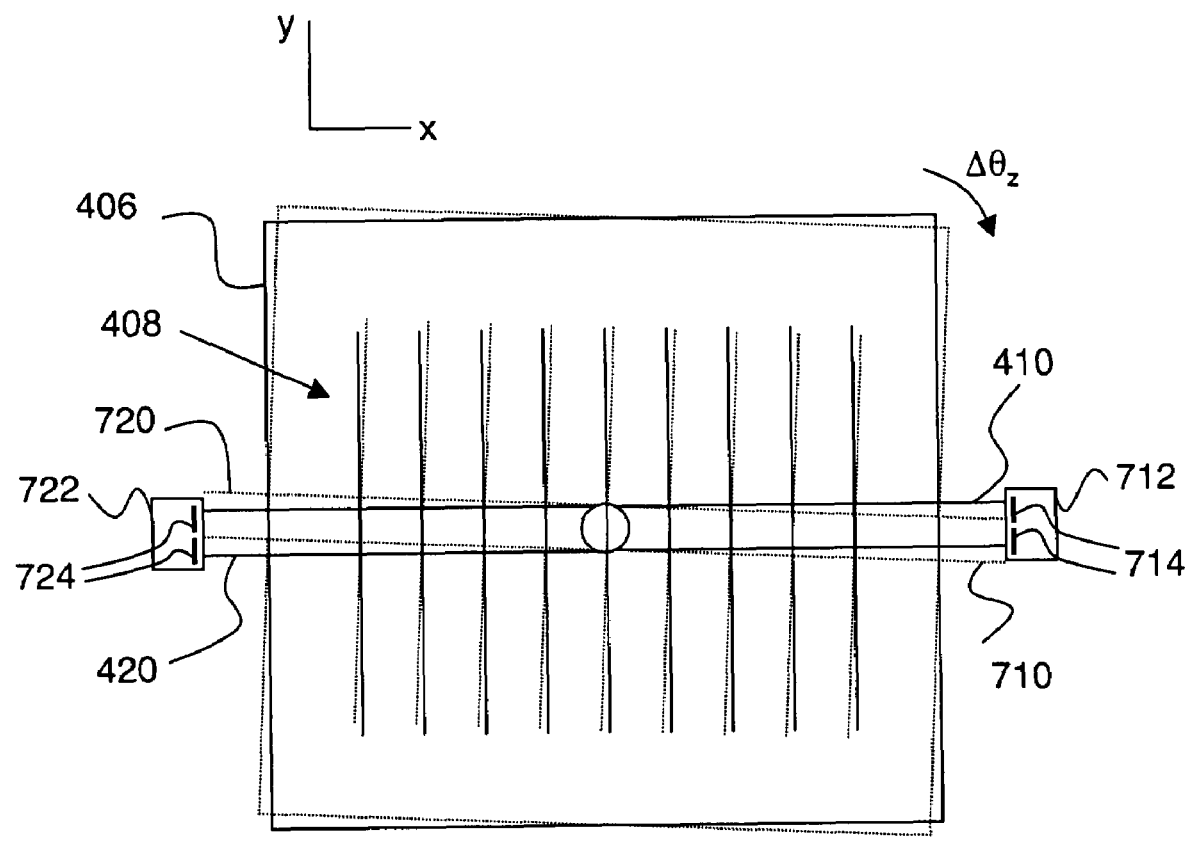
FIG. 7 shows a third embodiment of the invention.

FIG. 7 shows a third embodiment of the invention, where the detectors are modified to provide sensitivity to z-axis rotation $\Delta\theta_z$ in addition to the y-axis rotation sensitivity shown in connection with FIGS. 5 and 6a. FIG. 7 is a top view (i.e., x-y plane) as opposed to the side view (i.e., x-z plane) of FIG. 5. The embodiment of FIG. 7 is similar to the embodiment of FIG. 5, except that detectors 412 and 422 on FIG. 5 are replaced with detectors 712 and 722 having split cell detector elements 714 and 724 respectively. Detectors 712 and 722 provide position sensitive outputs $Y_1$ and $Y_2$ respectively, responsive to a lateral (i.e. y-directed) change in beam position, in addition to outputs $Z_1$ and $Z_2$ as described above. In more general terms, it is convenient to regard the first diffraction plane as defined with respect to a reference angular orientation of the test object. With this convention, detectors 712 and 722 are responsive to deviation of diffracted beams 410 and 420 from the first diffraction plane (e.g., as shown by beam positions 710 and 720 respectively). The difference of $Y_1$ and $Y_2$ is responsive to the angular displacement $\Delta\theta_z$. This embodiment provides measurement capability for $\Delta\theta_z$ in combination with the enhanced measurement sensitivity for angular displacement $\epsilon_1$ of the embodiment of FIG. 5.

Figures 8A, 8B:
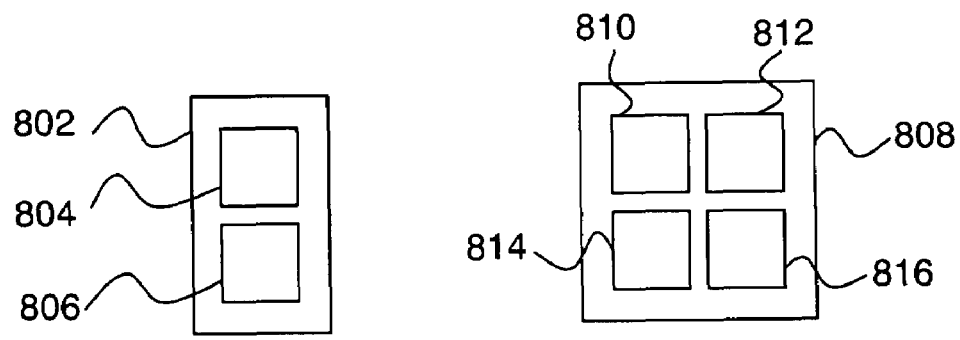
FIG. 8a-b show detector configurations suitable for use in embodiments of the invention.

FIGS. 8a-b show detector configurations suitable for use in embodiments of the invention. FIG. 8a shows a split cell detector 802 having two separate detector elements 804 and 806. Such a detector is suitable for use in the embodiments of FIGS. 4 and 5, to provide vertical position outputs such as $Z_1$ and $Z_2$. FIG. 8b shows a quad cell detector 808 having four separate detector elements 810, 812, 814, and 816. Such a detector is suitable for use in the embodiment of FIG. 7, to simultaneously provide vertical and lateral outputs, such as $(Z_1, Y_1)$ from detector 712 and $(Z_2, Y_2)$ from detector 714. Split cell and quad cell detectors suitable for use in embodiments of the invention are well known in the art. Any other method of observing or measuring diffracted beam position can also be employed in practicing the invention.

Figure 9:
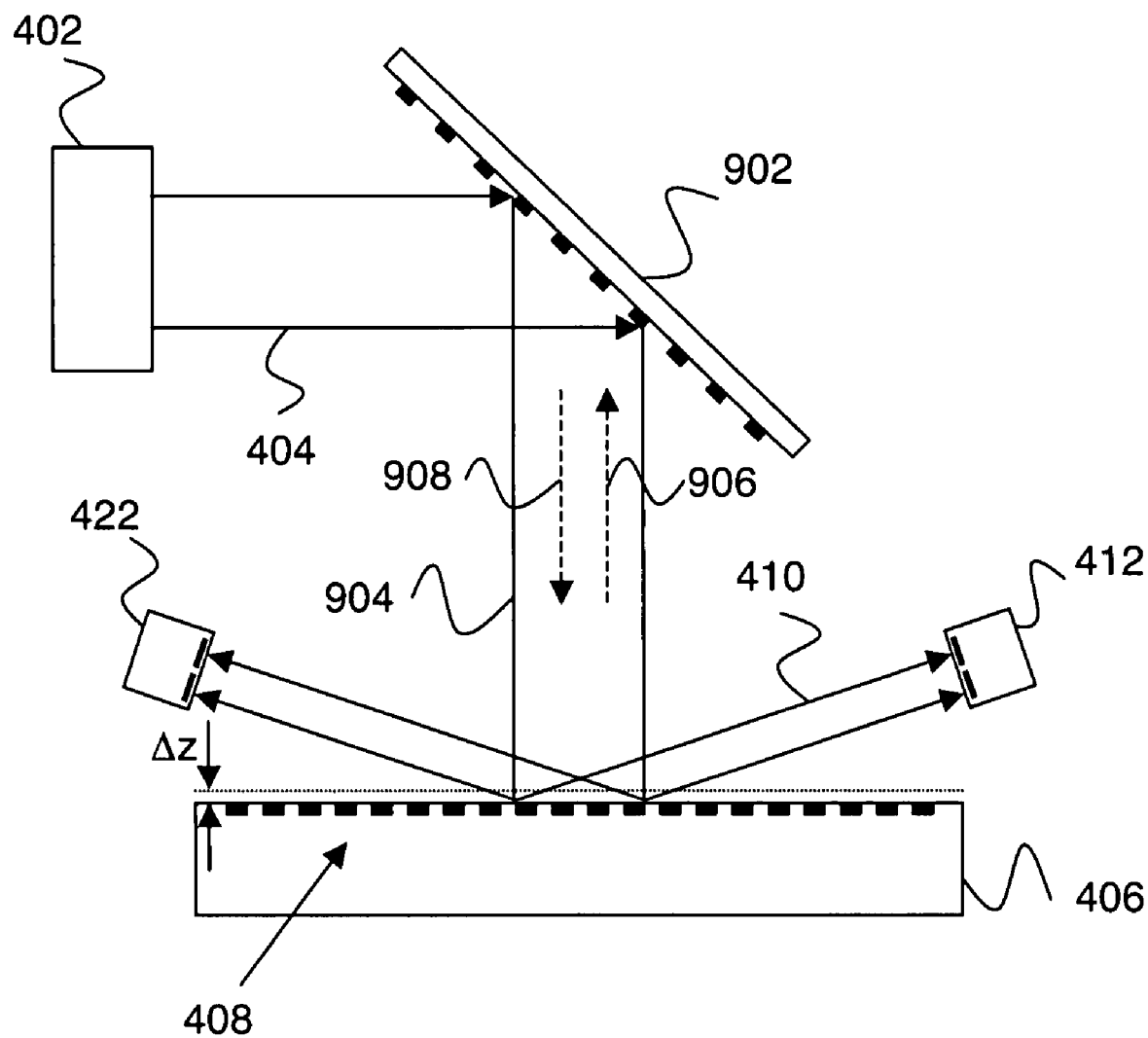
FIG. 9 shows a fourth embodiment of the invention.

FIG. 9 shows a fourth embodiment of the invention, where an interferometer is added to the angular sensor to provide more sensitive capability for measuring vertical displacement $\Delta z$. This embodiment is similar to the embodiment of FIG. 5, except that a Littrow grating 902 is disposed in the incident beam path. Littrow grating 902 performs two functions. The first function is directing beam 404 to illuminate grating 408 as a normally incident beam 904. The second function is retro-diffracting light traveling along path 906 to propagate along path 908. Any grating arranged to provide such retro-diffraction can be referred to as a Littrow grating. Methods for selecting the grating period and the angles of incidence and diffraction for a given optical wavelength to provide a Littrow grating as described are well known in the art. Since the 0 order light from grating 408 (i.e., the specular reflection) propagates along path 906, the combination of grating 408 and Littrow grating 902 form an optical resonator, with light recirculating along paths 906 and 908.

With this arrangement, the total power in diffracted beams 410 and 420 will depend periodically on the vertical displacement $\Delta z$, in accordance with well known principles of interferometry. Detectors 412 and 422 can provide power outputs $P_1$ and $P_2$ which are responsive to $\Delta z$. Determination of $\Delta z$ can be based on four measured quantities: $P_1$, $P_2$, $Z_1$, and $Z_2$.

To maximize sensitivity, it is preferable for the interferometer in the example of FIG. 9 to be impedance matched. More specifically, let $\eta_0$ be the 0 order diffraction efficiency of grating 408 (i.e., the fraction of normally incident light that is diffracted into 0 order). Let $\eta_L$ be the Littrow efficiency of grating 902 (i.e., the fraction of incident light along path 906 that is retro-diffracted along path 908). Impedance matching the resonator entails selecting the various design parameters such that $\eta_0 = \eta_L$.

Figure 10A:
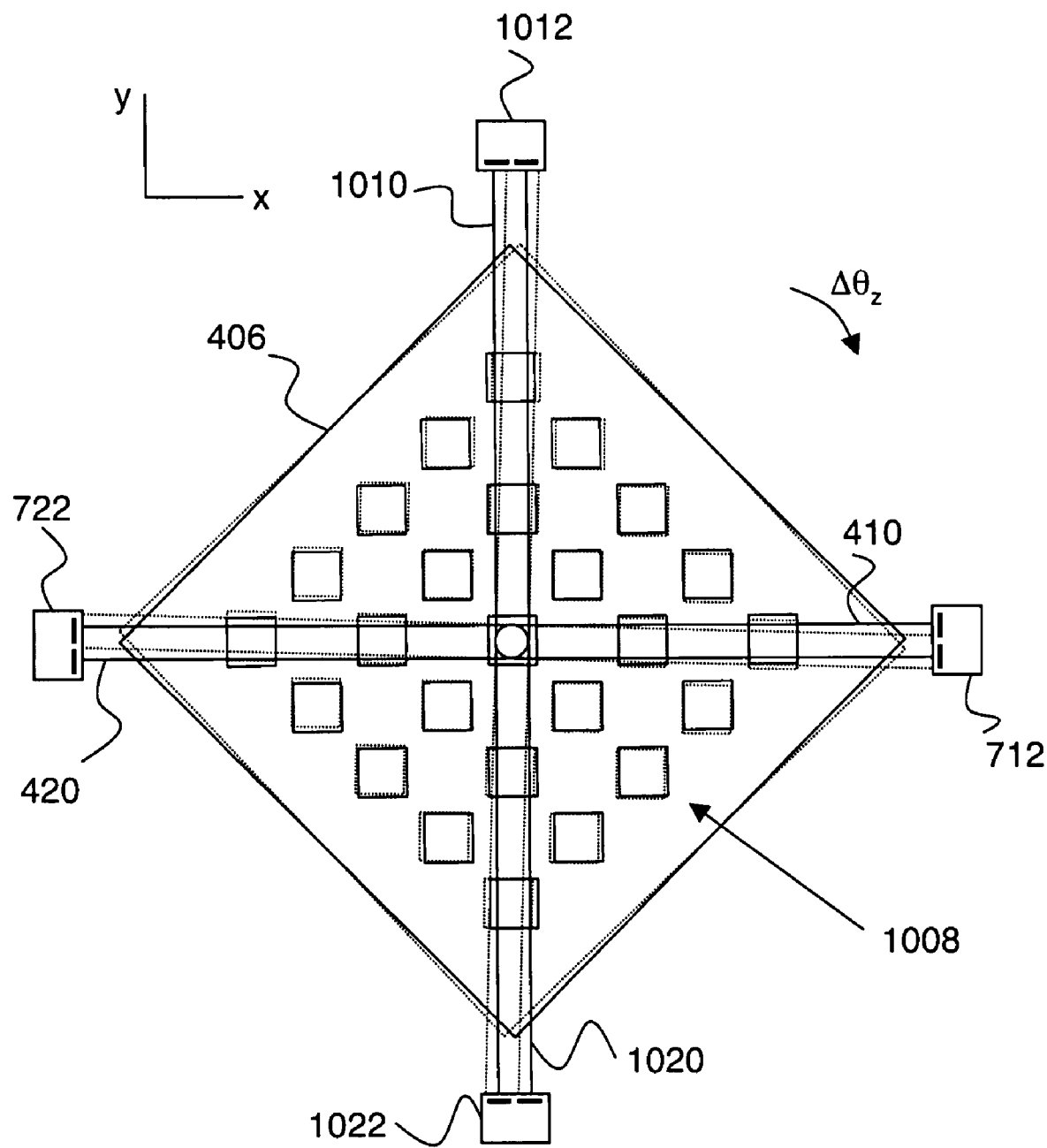
FIGS. 10a-c show several views of a fifth embodiment of the invention.
Figure 10B:
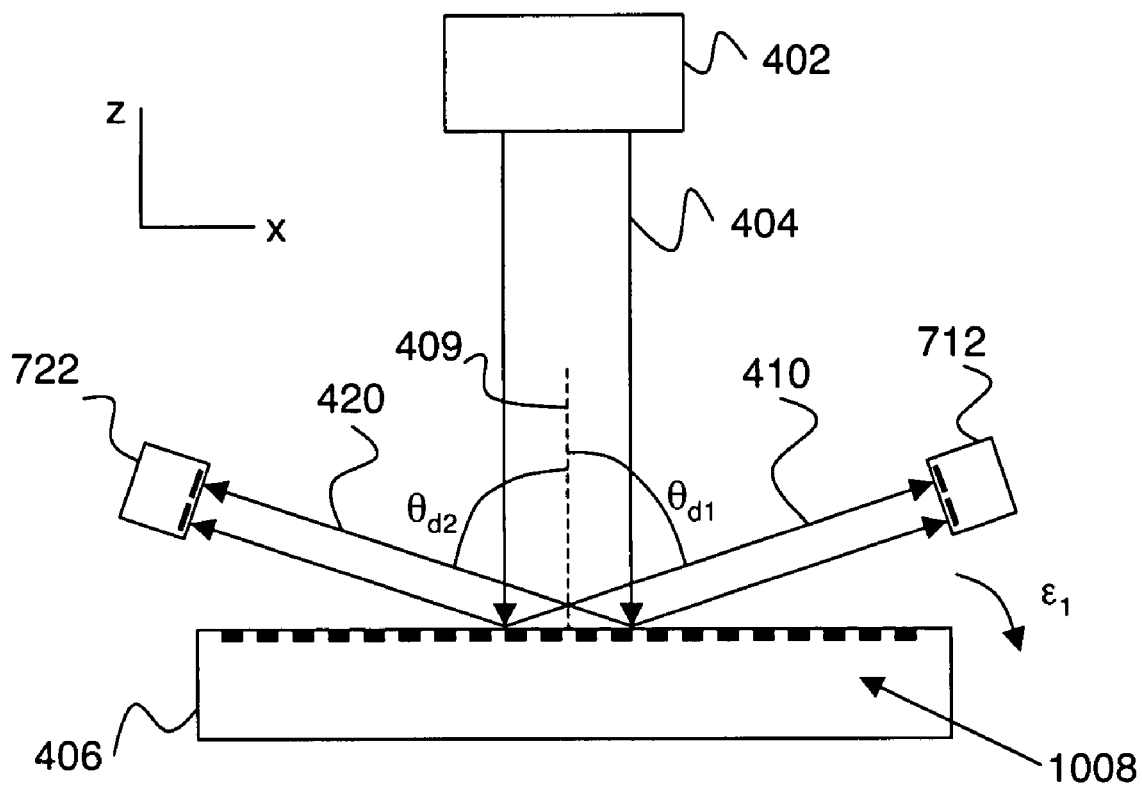
Figure 10C:
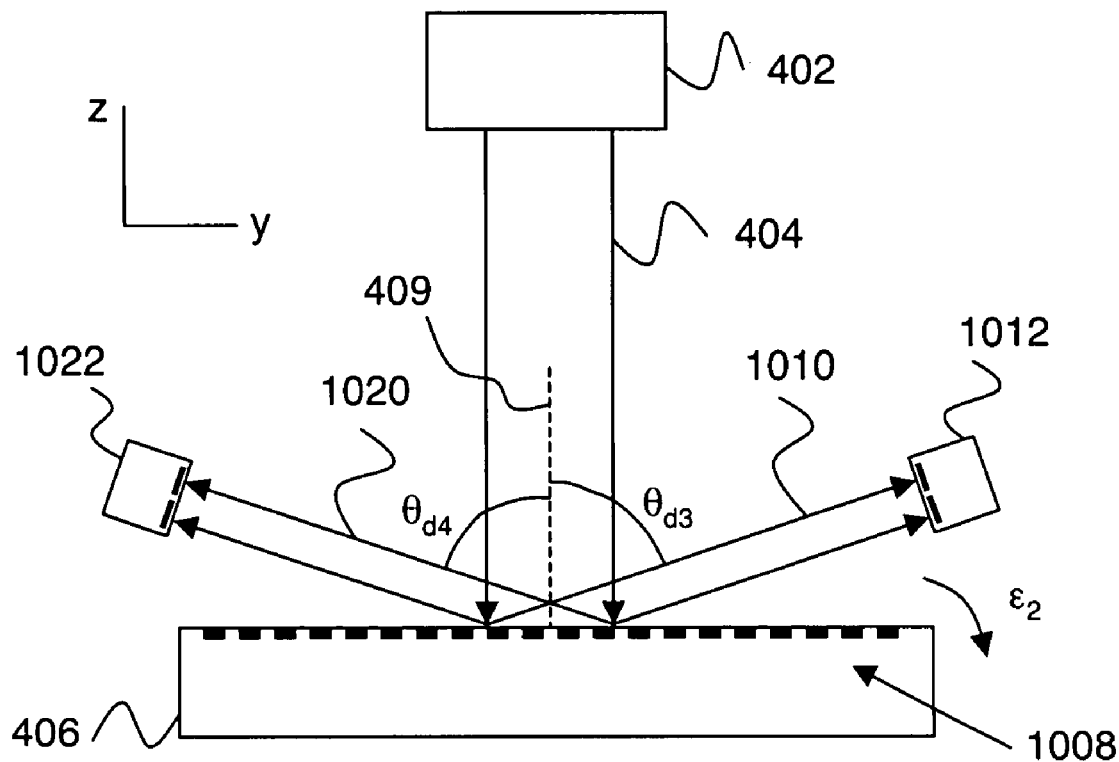

Sensitivity to all three angular degrees of freedom can be provided by employing principles of the invention in connection with a two-dimensional grating on the test object. FIGS. 10a-c show several views of such an embodiment of the invention.

FIG. 10a is a top view showing a 2-D grating 1008 on test object 406. Normally incident light on grating 1008 is diffracted into a first diffracted beam 410, a second diffracted beam 420, a third diffracted beam 1010, and a fourth diffracted beam 1020. Beams 410, 420, 1010, and 1020 are received by first, second, third and fourth detectors 712, 722, 1012, and 1022 respectively. These detectors can be quad cell detectors. Detectors 712 and 722 provide outputs $Y_1$ and $Y_2$ responsive to lateral deviation of the first and second diffracted beam from the first diffraction plane, as described in connection with FIG. 7. Similarly, detectors 1012 and 1022 provide outputs $X_3$ and $X_4$ responsive to lateral deviation of the third and fourth diffracted beams from a second diffraction plane. The second diffraction plane (y-z plane) in this example is perpendicular to the first diffraction plane (x-z plane). The differences $Y_1-Y_2$ and $X_3-X_4$ are responsive to rotation about the grating surface normal $\Delta\theta_z$.

FIG. 10b shows a view in the first diffraction plane (x-z plane). First diffracted beam 410 has a diffraction angle $\theta_{d1}$ with respect to grating normal 409. Second diffracted beam 420 has a diffraction angle $\theta_{d2}$ with respect to grating normal 409. An angular displacement $\epsilon_1$ of test object 406 in the first diffraction plane (i.e., a rotation about the y axis) provides corresponding changes $\Delta\theta_{d1}$ and $\Delta\theta_{d2}$ in the diffraction angles. The changes $\Delta\theta_{d1}$ and $\Delta\theta_{d2}$ are substantially greater than $\epsilon_1$ due to the above-described angular magnification effect. Detectors 712 and 722 provide position sensitive outputs $Z_1$ and $Z_2$ respectively. As described above in connection with FIGS. 6a-b, the sum $Z_1+Z_2$ is responsive to vertical displacement $\Delta z$ and the difference $Z_1-Z_2$ is responsive to angular displacement $\epsilon_1$.

FIG. 10c shows a view in the second diffraction plane (y-z plane). Third diffracted beam 1010 has a diffraction angle $\theta_{d3}$ with respect to grating normal 409. Fourth diffracted beam 1020 has a diffraction angle $\theta_{d4}$ with respect to grating normal 409. An angular displacement $\epsilon_2$ of test object 406 in the second diffraction plane (i.e., a rotation about the x axis) provides corresponding changes $\Delta\theta_{d3}$ and $\Delta\theta_{d4}$ in the diffraction angles. The changes $\Delta\theta_{d3}$ and $\Delta\theta_{d4}$ are substantially greater than $\epsilon_2$ due to the above-described angular magnification effect. Detectors 1012 and 1022 provide position sensitive outputs $Z_3$ and $Z_4$ respectively. As described above in connection with FIGS. 6a-b, the sum $Z_3+Z_4$ is responsive to vertical displacement $\Delta z$ and the difference $Z_3-Z_4$ is responsive to angular displacement $\epsilon_2$.

The combined sum $Z_1+Z_2+Z_3+Z_4$ can be used as a measure of $\Delta z$. Vertical displacement sensing in the embodiment of FIGS. 10a-c can also be enhanced by combining it with vertical interferometry as described in connection with FIG. 9.

Figure 11:
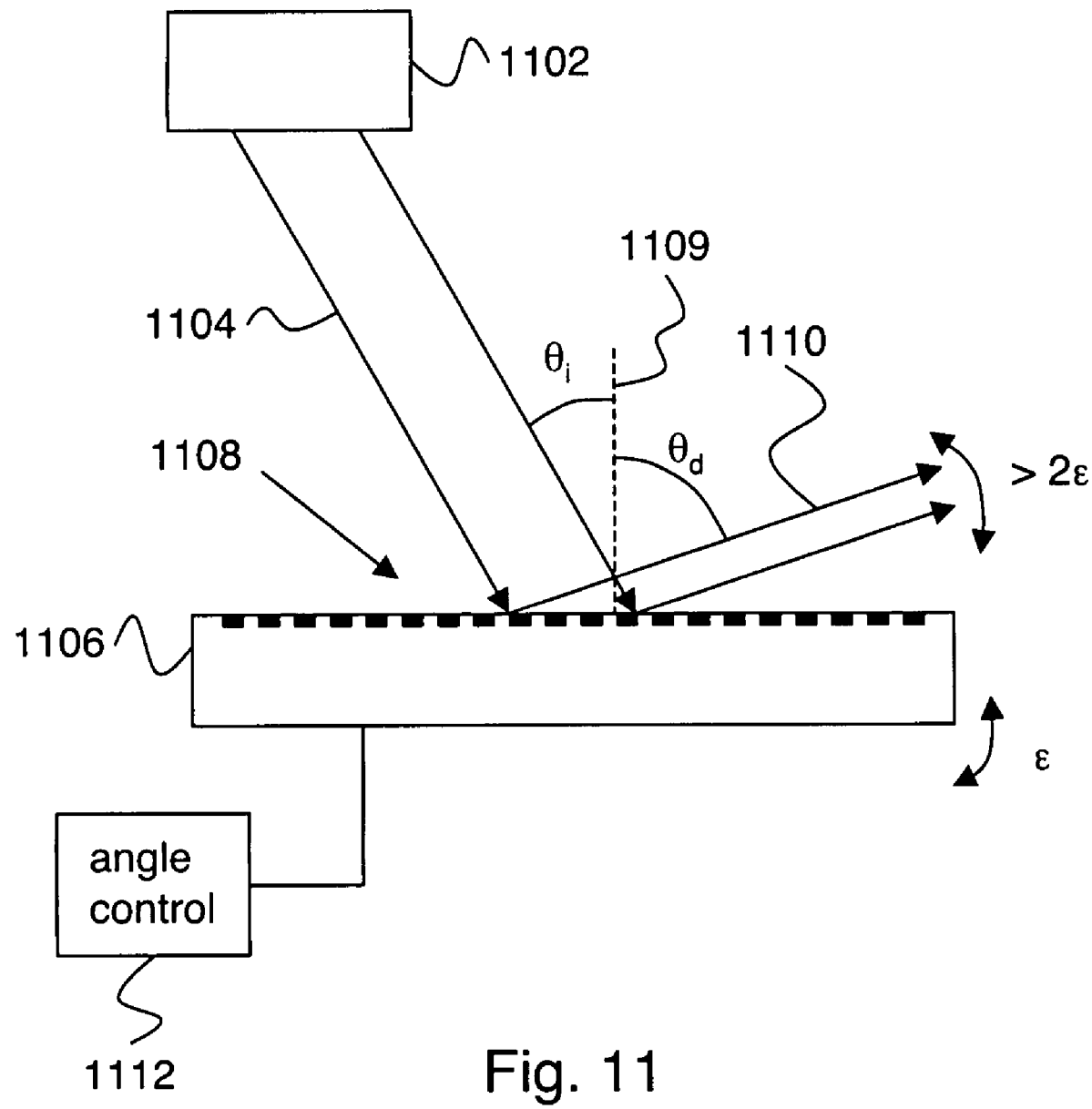
FIG. 11 shows a sixth embodiment of the invention.

Principles of the invention are applicable to angular scanning as well as to angular displacement sensing as described above. FIG. 11 shows a beam deflector or scanner in accordance with an embodiment of the invention. An optical source 1102 provides a substantially monochromatic beam 1104 of optical radiation to a diffraction grating 1108 disposed on a deflector 1106. Beam 1104 is incident on grating 1108 at an angle of incidence $\theta_i$, and a diffracted beam 1110 is diffracted from grating 1108 at a diffraction angle $\theta_d$. As described above, an angular displacement $\epsilon$ of deflector 1106 provides corresponding changes $\Delta\theta_i$ and $\Delta\theta_d$ in the incidence and diffraction angle. The change $\Delta\theta_d$ is substantially larger than $\epsilon$, and $\Delta\theta_i=\epsilon$. An angle control 1112 can be employed to vary the angular displacement of deflector 1106. The resulting deflection in diffracted beam angle is $>2\epsilon$. More specifically, the diffracted beam deflection is $\epsilon(1+M)$, where $M>1$ is the above-defined magnification factor. A conventional mirror-based beam deflector would provide an reflected beam deflection of $2\epsilon$. Such angular magnification can provide increased bandwidth in applications such as laser printing laser scanning, and optical switching.

If scanning is performed over a significant range of angles, it may be important to account for the nonlinearity of the dependence of $\Delta\theta_d$ on $\epsilon$. Such nonlinearity can be accounted for by appropriate pre-compensation of angle control 1112. For example, an inverse-cosine pre-compensation can be employed to drive $\epsilon$ in a nonlinear manner such that $\Delta\theta_d$ changes linearly during a scan.

The invention claimed is:

1. Apparatus for measuring a change of angular orientation of a test object, the apparatus comprising;
   an optical source providing an incident beam of substantially monochromatic optical radiation to said test object at an angle of incidence $\theta_i$, wherein a diffraction grating disposed on said test object is illuminated by said incident beam and provides a first diffracted beam having a first diffraction angle $\theta_{d1}$ responsive to said incident beam;
   wherein for a reference angular orientation of said test object, said incident beam and said first diffracted beam define a first diffraction plane;
   a first optical detector receiving said first diffracted beam and providing a first output responsive to a position of said first diffracted beam on said first detector in said first diffraction plane;
   wherein a first change $\epsilon_1$ of angular orientation of said test object in said first diffraction plane relative to said reference angular orientation induces corresponding changes $\Delta\theta_i$ of said angle of incidence and $\Delta\theta_{d1}$ of said first diffraction angle;
   wherein $\Delta\theta_i=\epsilon_1$ and wherein $\theta_i$ and $\theta_{d1}$ are selected such that $\Delta\theta_{d1}$ is substantially greater than $\epsilon_1$.

2. The apparatus of claim 1, wherein $\Delta\theta_d>2\epsilon_1$.

3. The apparatus of claim 1, wherein a width $W_d$ of said first diffracted beam in said first diffraction plane is substantially less than a width $W_i$ of said incident beam in said first diffraction plane.

4. The apparatus of claim 1, wherein $W_d<0.5W_i$.

5. The apparatus of claim 1, wherein $\theta_i<10°$ and wherein $\theta_{d1}>75°$.

6. The apparatus of claim 1, wherein a wavelength of said optical radiation and a period of said diffraction grating are selected such that diffraction from said diffraction grating only occurs in orders 0, 1, and −1.

7. The apparatus of claim 1, wherein said first optical detector comprises a split cell photodetector.

8. The apparatus of claim 1, wherein said first optical detector comprises a quad cell photodetector further providing a lateral output responsive to a deviation of said first diffracted beam from said first diffraction plane;
   wherein said lateral output provides a measure of rotation $\Delta\theta_z$ of said test object about a surface normal of said diffraction grating.

9. The apparatus of claim 1, further comprising an optical interferometer responsive to a displacement $\Delta z$ of said test object along a surface normal direction of said diffraction grating.

10. The apparatus of claim 9, wherein $\theta_i$ is substantially equal to zero, and wherein said interferometer comprises a Littrow grating disposed in a path of said incident beam to form an optical resonator defined by said Littrow grating and by said diffraction grating on said test object.

11. The apparatus of claim 10, wherein a 0 order diffraction efficiency of said diffraction grating on said test object is substantially equal to a Littrow diffraction efficiency of said Littrow grating.

12. The apparatus of claim 1, further comprising a second optical detector receiving a second diffracted beam having a second diffraction angle $\theta_{d2}$ from said diffraction grating and providing a second output responsive to a position of said second diffracted beam in said first diffraction plane on said second detector;
   wherein said first change $\epsilon_1$ of angular orientation of said test object induces a corresponding change $\Delta\theta_{d2}$ of said second diffraction angle;
   wherein $\theta_i$ and $\theta_{d2}$ are selected such that $\Delta\theta_{d2}$ is substantially greater than $\epsilon_1$.

13. The apparatus of claim 12, wherein $\theta_i$ is substantially equal to zero, and wherein said first and second diffracted beams are provided by 1 and −1 order diffraction.

14. The apparatus of claim 13, wherein a difference between said first and second outputs is provided as a measure of said angular change $\epsilon_1$.

15. The apparatus of claim 14, wherein a sum of said first and second outputs is provided as a measure of displacement $\Delta z$ of said test object along a surface normal direction of said diffraction grating.

16. The apparatus of claim 1, wherein said diffraction grating is a 2-dimensional grating having periodicity in two distinct directions.

17. The apparatus of claim 16, wherein said diffraction grating provides a third diffracted beam having a third diffraction angle $\theta_{d3}$ responsive to said incident beam;
   wherein for a reference angular orientation of said test object, said incident beam and said third diffracted beam define a second diffraction plane, wherein said first and second diffraction planes intersect;
   further comprising a third optical detector receiving said third diffracted beam and providing a third output responsive to a position of said third diffracted beam on said third detector in said second diffraction plane;
   wherein a second change $\epsilon_2$ of angular orientation of said test object in said second diffraction plane relative to said reference angular orientation induces corresponding changes $\Delta\theta_i$ of said angle of incidence and $\Delta\theta_{d3}$ of said third diffraction angle;
   wherein $\Delta\theta_i=\epsilon_2$ and wherein $\theta_i$ and $\theta_{d3}$ are selected such that $\Delta\theta_{d3}$ is substantially greater than $\epsilon_2$.

18. The apparatus of claim 17, further comprising a second optical detector receiving a second diffracted beam having a second diffraction angle $\theta_{d2}$ from said diffraction grating and providing a second output responsive to a position of said second diffracted beam in said first diffraction plane on said second detector;

wherein said first change $\epsilon_1$ of angular orientation of said test object induces a corresponding change $\Delta\theta_{d2}$ of said second diffraction angle;

wherein $\theta_i$ and $\theta_{d2}$ are selected such that $\Delta\theta_{d2}$ is substantially greater than $\epsilon_1$.

19. The apparatus of claim 18, further comprising a fourth optical detector receiving a fourth diffracted beam having a fourth diffraction angle $\theta_{d4}$ from said diffraction grating and providing a fourth output responsive to a position of said fourth diffracted beam in said second diffraction plane on said fourth detector;

wherein said second change $\epsilon_2$ of angular orientation of said test object induces a corresponding change $\Delta\theta_{d4}$ of said fourth diffraction angle;

wherein $\theta_i$ and $\theta_{d4}$ are selected such that $\Delta\theta_{d4}$ is substantially greater than $\epsilon_2$.

20. The apparatus of claim 19, wherein a difference between said first and second outputs is provided as a measure of said angular change $\epsilon_1$, wherein a difference between said third and fourth outputs is provided as a measure of said angular change $\epsilon_2$, and wherein a sum of said first, second, third, and fourth outputs is provided as a measure of displacement $\Delta z$ of said test object along a surface normal direction of said diffraction grating.

21. The apparatus of claim 19, wherein said first, second, third, and fourth optical detectors each comprise a quad cell photodetector further providing, respectively:

a first lateral output responsive to deviation of said first diffracted beam from said first diffraction plane;

a second lateral output responsive to deviation of said second diffracted beam from said first diffraction plane;

a third lateral output responsive to deviation of said third diffracted beam from said second diffraction plane;

a fourth lateral output responsive to deviation of said fourth diffracted beam from said second diffraction plane;

and wherein said first, second, third, and fourth lateral outputs provide a measure of rotation $\Delta\theta_z$ of said test object about a surface normal of said diffraction grating.

22. Apparatus for deflecting an optical beam, the apparatus comprising;

an optical source providing an incident beam of substantially monochromatic optical radiation;

a deflector comprising a diffraction grating, wherein said incident beam is incident on said diffraction grating at an angle of incidence $\theta_i$, and wherein said diffraction grating provides a diffracted beam having a diffraction angle $\theta_d$ responsive to said incident beam;

wherein for a reference angular orientation of said deflector, said incident beam and said diffracted beam define a diffraction plane;

wherein a change $\epsilon$ of angular orientation of said deflector in said diffraction plane relative to said reference angular orientation induces corresponding changes $\Delta\theta_i$ of said angle of incidence and $\Delta\theta_d$ of said diffraction angle;

wherein $\Delta\theta_i = \epsilon$ and wherein $\theta_i$ and $\theta_d$ are selected such that $\Delta\theta_d$ is substantially greater than $\epsilon$.

23. A scanner comprising the apparatus of claim 22.

\* \* \* \* \*